Jan. 11, 1927.
H. F. SCHMIDT
FLUID TACHOMETER
Filed Dec. 17, 1924
1,613,727
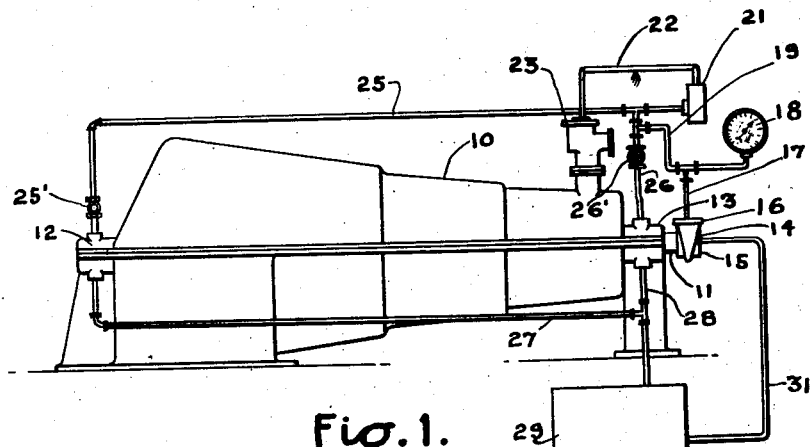
Fig. 1.
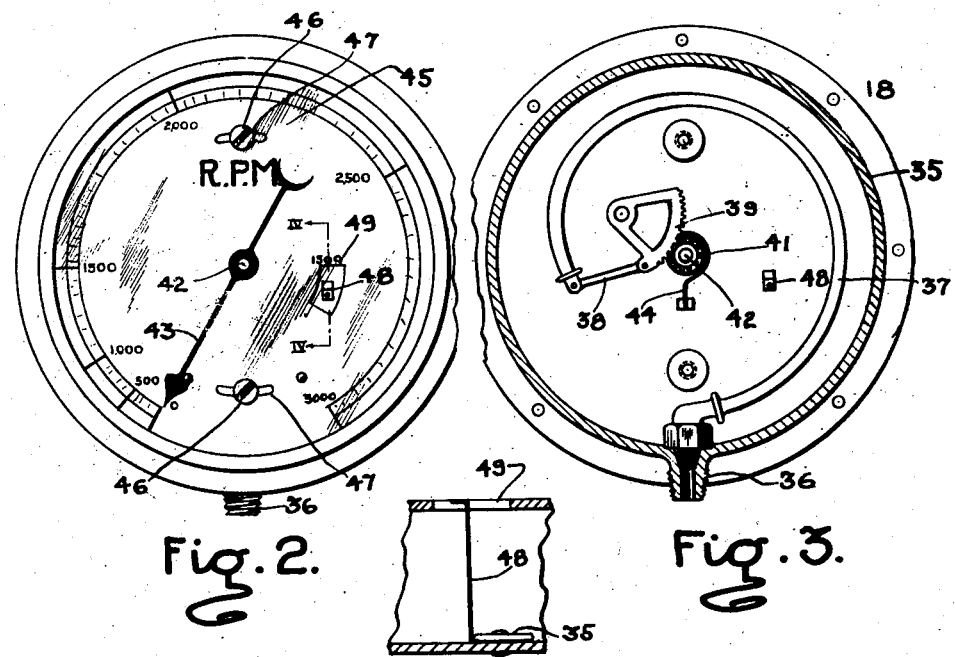
Fig. 2.   Fig. 3.
Fig. 4.
H. F. Schmidt
INVENTOR Patented Jan. 11, 1927.

1,613,727

UNITED STATES PATENT OFFICE.

HENRY F. SCHMIDT, OF LANSDOWNE, PENNSYLVANIA, ASSIGNOR TO WESTINGHOUSE ELECTRIC & MANUFACTURING COMPANY, A CORPORATION OF PENNSYLVANIA.

FLUID TACHOMETER.

Application filed December 17, 1924. Serial No. 756,424.

My invention relates to tachometers, particularly to tachometers which are actuated by fluid pressure, and it has for an object to provide apparatus of the character designated which shall indicate accurately the angular velocity of a rotating body and which shall have embodied within the tachometer means for readily determining the accuracy of the velocity indicated.

These and other objects, which will be made apparent throughout the further description of my invention, may be attained by the employment of the apparatus hereinafter described and illustrated in the accompanying drawing, in which Fig. 1 is a diagrammatic arrangement of a prime mover equipped with one form of my tachometer for indicating its rotational velocity; Fig. 2 is a view, in elevation, of the tachometer employed in Fig. 1; Fig. 3 is a view, in sectional elevation, of the tachometer and Fig. 4 is a partial sectional view taken on the line IV—IV of Fig. 2.

Machines of the high speed rotary type, such as steam turbines, centrifugal pumps, blowers, etc., are generally provided with suitable devices for indicating their rotational velocities. One form of indicating device which is frequently associated with steam turbines is a tachometer of the vibrating reed type. In this type of indicating device, a plurality of vibrating elements or reeds having relatively different periods of vibration are employed, and the number of revolutions per minute is ascertained by noting the reed or reeds which are in vibration. However, as it is generally customary to operate turbines at a substantially constant speed, the reeds corresponding to that speed, as a result of continuous vibration, become fatigued and eventually fail. Furthermore, owing to the highly developed state to which the static and dynamic balancing arts have recently been developed, rotary machines may now be so accurately balanced that the vibration incident to their designed operating speeds is almost nil. Under these conditions, tachometers of the vibrating reed type may be rendered ineffective, as with slightly varying speeds when under load the vibration of the machine is not enough to set the reeds vibrating with sufficient amplitude to insure a positive indication of the speed at any instant.

I have therefore developed a form of tachometer which is especially adapted for use with high speed rotary machines, as steam turbines, which are frequently provided with fluid pressure generating means, the fluid pressure generated being utilized to govern the speed of the turbine or to convey lubricant to the bearings. The pressure developing apparatus generally employed comprises a pump of the impeller type which is driven by the shaft of the turbine, the pressure developed by the pump varying as the square of the R. P. M. of the shaft. I have therefore devised a tachometer which is actuated by fluid pressure. It comprises a Bourdon tube having suitable indicating means associated therewith, which indicating means are graduated preferably in R. P. M. For checking the accuracy of the device at all times, I have associated therewith a vibrating element, such as a reed, which is adapted to vibrate at a predetermined speed. By noting the position of the indicator at this speed, the indications of the tachometer may be easily verified and, if found inaccurate, the necessary adjustments may be effected. I prefer to provide a reed having a different period of vibration from that incident to the normal operating speed of the machine, the reed remaining normally inactive. Upon starting the machine, however, and before it has acquired its normal operating speed, the rotations of the machine may be made such as to utilize the reed to test the accuracy of the tachometer.

Referring to the drawing, I show in Fig. 1 a rotary machine, such as a turbine 10, provided with a shaft 11 supported in suitable bearings 12 and 13. Connected to the shaft 11 is a pump 14 having an inlet connection 15 and a discharge connection 16. The pump discharges through a conduit 17 which communicates with one form of my novel tachometer 18. The conduit 17 further communicates through a conduit 19 with a pressure responsive mechanism 21 which actuates, through a lever 22, a valve 23 for controlling the admission of motive fluid to the turbine. The pressure-responsive mechanism 21 regulates the movements of the valve 23 in accordance with the pressure developed by the pump 14 in a manner well-known in the art. The discharge conduit 17 of the pump 14 also communicates through conduits 25 and 26 with the bearings 12 and 13 of the turbine for supplying lubricant thereto. Provided in the respective conduits 25 and 26 are fixed orifices 25' and 26' for insuring that the pressure of the lubricant acting upon the pressure-responsive mechanism 21 is not affected by the variable resistance to flow encountered by the lubricant in its passage through the bearings. The lubricant drainage from the bearings is conveyed by conduits 27 and 28 to a reservoir 29. The suction connection 15 of the pump 14 communicates, through a conduit 31, with the reservoir 29 for re-circulating the lubricant through the system.

The tachometer 18 comprises, as shown in Figs. 2 and 3, a casing 35 having provided therein a fluid pressure inlet 36. Connected to the inlet 36 is a Bourdon tube 37, or any suitable pressure-responsive element, which in turn is operatively connected through a link 38 and gears 39 and 41 to a shaft 42. Secured to the shaft 42 is a pointer 43, the movements of which are controlled by the pressure generated by the pump 14. Some suitable means such as a spring 44 is provided for biasing the shaft and pointer to a zero position. The tachometer is provided with a dial 45 which is preferably graduated, as illustrated, in R. P. M. The dial is adjustably secured to the casing 35 as by suitable screws 46 located in arcuate openings 47 by means of which the dial may be rotated relative to the pointer and the indications of the tachometer easily corrected, should they be found inaccurate. In order that the accuracy of the device may at all times be readily determined, I have provided a reed 48 which is visible through a suitable aperture 49 provided in the dial. The reed 47 has a period of vibration corresponding to that of the turbine at the speed at which it is desired to test the accuracy of the device.

From the foregoing description of my apparatus, it will be apparent that I have devised a novel form of tachometer which is rugged, reliable and extremely sensitive to changes in rotational velocity and which is furthermore provided with a novel means for checking the accuracy of the speed indicated. While I have described my device as being provided with only a single vibrating element, it is to be understood that it is within the purview of my invention to employ a plurality of reeds for ascertaining the accuracy of the tachometer at any desired number of points. In addition, while I have illustrated my invention as being associated with steam turbines, its use is not confined solely thereto and it may be readily employed with numerous forms of rotatable machinery having means for developing a fluid pressure proportional to their rotational velocity.

While I have shown my invention in but one form, it will be obvious to those skilled in the art that it is not so limited, but is susceptible of various other changes and modifications, without departing from the spirit thereof, and I desire, therefore, that only such limitations shall be placed thereupon as are imposed by the prior art, or as are specifically set forth in the appended claims.

What I claim is:

1. The combination with a pressure-responsive mechanism for indicating the speed of a moving body having means for generating a fluid pressure which is a function of its speed, of an element vibrated by the moving body at a predetermined speed for testing the accuracy of the indicating mechanism, said predetermined speed differing from the normal speed of the moving body.

2. The combination with a fluid tachometer for indicating the speed of a rotating body having means for generating a fluid pressure which is a function of its rotational velocity, of a vibrating element associated with said mechanism, said element being vibrated by the body at a predetermined speed for ascertaining the accuracy of the tachometer, said predetermined speed differing from the normal speed of the rotating body.

3. The combination with a Bourdon tube responsive to fluid pressure generated by a rotating body as a function of its rotational velocity, of a dial, means operatively connected to the Bourdon tube for indicating upon the dial the rotational speed of the body, a reed vibrated by the rotating body and having a predetermined period of vibration for ascertaining the accuracy of the Bourdon tube said period not corresponding with the normal speed of the rotating body, and adjustable means for positioning the dial with respect to the indicating means.

4. The combination with a Bourdon tube responsive to fluid pressure generated by a rotating body, of a dial, means operatively connected to the Bourdon tube for indicating upon the dial the rotational speed of the body, a reed vibrated by the body at an abnormal speed for indicating the accuracy of the Bourdon tube, and adjustable means for positioning the dial with respect to the indicating means.

5. The combination with a rotating body, of means associated with said body for generating a fluid pressure which is a function of its rotational velocity, a pressure-responsive device connected to said fluid pressure generating means, means operated by the pressure-responsive mechanism for indicating the rotational speed of the body, and a reed vibrated by the body at a predetermined speed for calibrating the pressure-responsive device, said speed differing from the normal rotational speed of said body.

In testimony whereof, I have hereunto subscribed my name this fifth day of December, 1924.

HENRY F. SCHMIDT.